Figure 1:
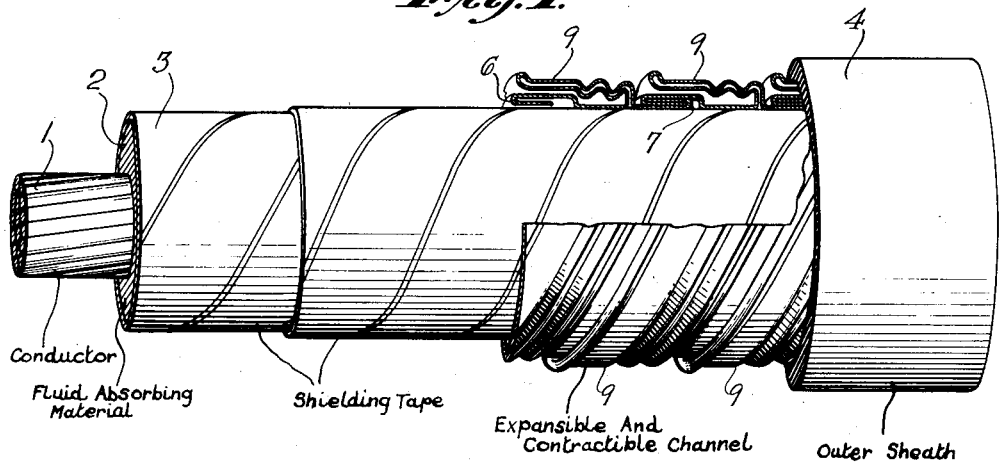

May 24, 1938. F. L. AIME 2,118,584
FLUID IMPREGNATED ELECTRIC CABLE
Filed May 31, 1934 2 Sheets-Sheet 1

INVENTOR.
FRANK L. AIME.
BY
ATTORNEYS

May 24, 1938.   F. L. AIME   2,118,584
FLUID IMPREGNATED ELECTRIC CABLE
Filed May 31, 1934   2 Sheets-Sheet 2
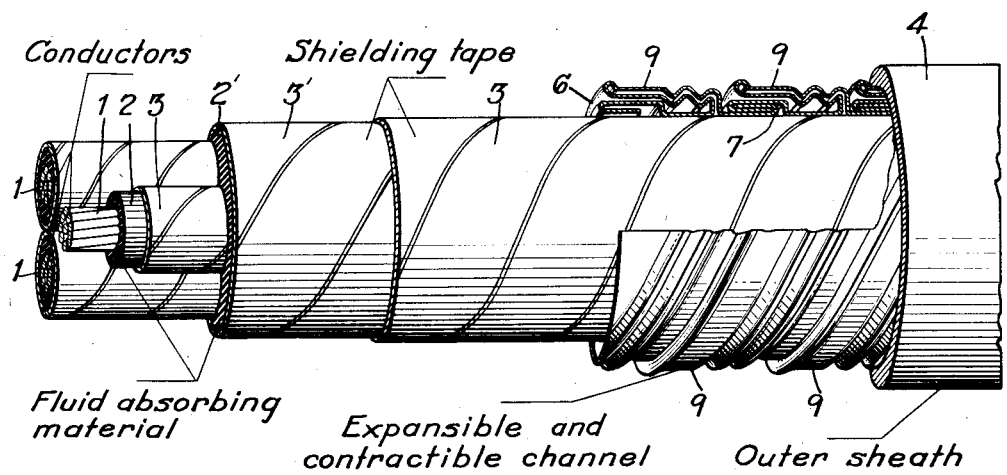
INVENTOR.
FRANK A. AIME.
BY Benj. T. Rauber ATTORNEY.

Patented May 24, 1938

2,118,584

UNITED STATES PATENT OFFICE 2,118,584

FLUID IMPREGNATED ELECTRIC CABLE

Frank L. Aime, New York, N. Y., assignor to Anaconda Wire & Cable Company, New York, N. Y., a corporation of Delaware Application May 31, 1934, Serial No. 728,215

5 Claims. (Cl. 173—266)

This invention relates to cables having insulating wrappings impregnated with an insulating fluid and sheathed with a metallic sheath and covered with suitable wrapping material. More particularly the present invention relates to the construction of the metallic sheath whereby the sheath is provided with means to permit the sheath to expand and contract with the expansion and contraction of the materials contained within the sheath and further to provide the sheath with means permitting the sheath to flex or bend freely.

In fluid impregnated electric cables the conductors in the cable are subjected to varying amounts of electric current and are therefore subjected to heating effects which at times increase the temperature of the conductor and of its enclosing wrappings very considerably and when the current decreases, permits this temperature to drop. When the insulating wrappings are thus heated, the oil or insulating fluid expands. A considerable pressure is exerted within the sheath of the cable due to the expansion of the impregnating fluid and the expansion of the other materials making up the core of the cable itself, such as copper and fibrous wrappings, which expansion may be of the order of 1% to 3% of the volume of the cable within the sheath. When the cable is covered with a lead sheath, the pressure thus created within the sheath may be so great as to expand the sheath beyond the yield point of the lead and thus stretch it. When the cable cools again the lead, being stretched, does not return to its original size and therefore creates voids or empty spaces within the cable under the sheath.

It is well known that the creation of such voids tends to ionization and thus produces deterioration of the cable insulation in a much shorter time than would be the case if those voids did not exist and the cable were operating normally.

In accordance with the present invention I have replaced the heretofore employed lead sheath with a sheath comprised of metal of relatively high elasticity and by a particular shaping of the metal I have provided the sheath with means to permit the sheath to expand with the expansion of the materials within the cable core and to contract with the contraction of said materials so that the creation of voids within the sheath is eliminated. Further, this particular structure of the sheath provides means to flex or bend the sheath as may be desired.

Figure 2:
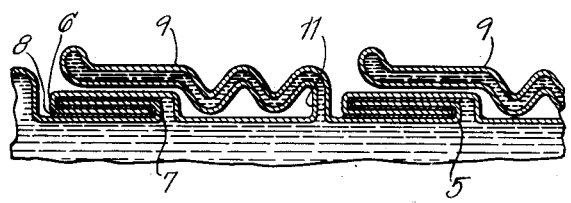

The various features of the present invention are illustrated in the accompanying drawings in which Fig. 1 is a side elevation partly in section of the cable structure including the conductor, wrappings, sheath and outer cover. Fig. 2 is an enlarged sectional view of the sheath illustrated in Fig. 1. Figs. 3 to 6 inclusive show various specific modifications of the sheath illustrated in Figs. 1 and 2. Fig. 7 is a view similar to that of Fig. 1, showing a cable having several conductors.

Referring to Fig. 1, the cable structure includes a conductor 1 which may, for example, be a stranded conductor as indicated on the drawings, or alternatively of other constructions common to the art, such as hollow or multiple type conductors. A wrapping of fluid absorbing material 2 surrounds the conductor 1 and a shielding tape wrapping 3 encloses the conductor and fluid absorbing material 2. A sheath 9 surrounds the tape 3 and an outer wrapping 4 completes the cable structure.

Sheath 9 in accordance with the present invention is comprised of a strip of metal having relatively high elasticity preformed in one or more of the shapes indicated in Figs. 1 to 6 inclusive, to provide the same with means to permit expansion and contraction of the sheath coincident with the expansion and contraction of the materials enclosed by the sheath and to provide means whereby the sheath may be bent and flexed. To accomplish this the strip 9 is wound helically to form a tubular structure adapted closely to fit the outer periphery of the wrapped conductor 1, and the adjacent edges of the strip are bent in interlocking relationship and soldered at their juncture in any convenient manner to form a fluid impervious seal thereby obtaining a continuous tubular structure. The center section of the strip is convoluted to form a channel section having an opening to the interior of the said tubular structure. Preferably the channel section is bent in the manner shown to overlap the strip thereby providing means to obtain a desired volume within the channel to obtain a determined volumetric expansion therein.

Figure 3:
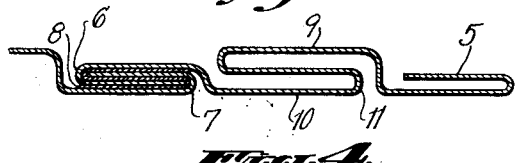
Figure 4:
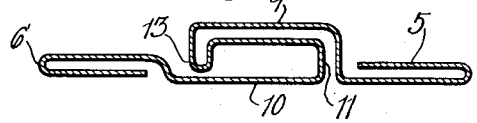
Figure 5:
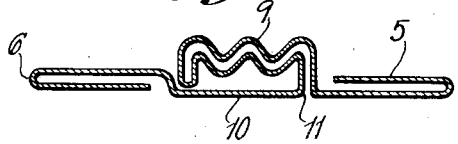
Figure 6:

The overlying channel of the strip is identified as numeral 9 in the drawings and, as may be noted from Figs. 1 to 6 inclusive, may take one or more of a plurality of shapes adapting the same to special service conditions. The essential characteristic of this channel 9 is that it opens into the interior of the tubular structure thereby providing a reservoir which may be filled with oil as indicated in Fig. 2. The side walls of the channel member may be straight as indicated in Fig. 3 or may be provided with a downwardly depending end section 13 as indicated in Fig. 4; or an upwardly extending end section 13 as indicated in Fig. 6; or the side walls intermediate the said end sections 12 and 13 may be corrugated at least in part as indicated in Figs. 1, 2 and 5. These different modifications in the specific structure of the side walls of the channel member 9 are designed to provide greater or lesser flexibility in the said side walls as the internal conditions of expansion and contraction within the interior of the tubular structure may warrant and demand.

To provide for the interlocking of the adjacent edges of the helically wound strip the edges of the strip are provided with turned edges 5 and 6 which are adapted to make an interlocking connection with adjacent edges substantially as indicated in Fig. 3. On winding the strip helically the adjacent edges are engaged in interlocking relationship substantially as shown and the interlocking surfaces are sealed as by soldering to form an oil impervious connection. Preferably the sheath is wound upon the wrapped cable 1 into a finished structure and thereafter the same is impregnated with fluid such as oil in the usual manner.

The thus formed helically wound sheath possesses two structural advantages. When the interior of the sheath is impregnated with oil the helical channel 9 becomes filled with the oil substantially as indicated in Fig. 2. Upon expansion and contraction of the oil within the sheath the side walls of the channel 9 flexes outwardly or inwardly as the case may be. The thinness of these walls may vary widely without departure from the present invention, as may also the spacing of the walls of the channel 9.

Flexibility and bending is imparted to the cable by section 10 coacting with channel 9 whereby an angular displacement of the cable sheath about the axis 11 may easily be obtained.

In Fig. 7 is shown a cable constructed in accordance with my invention and having three conductors, each of which is enclosed in a wrapping 2 of fluid absorbing material and a shielding tape 3. All of the shielded conductors may then be enclosed in a common shielding tape 3'. Filling material or wrapping 2' may be interposed between the shielding tape 3 and the shielding tape 3'. The remaining elements of the cable are similar to those of Fig. 1 and are similarly identified and, therefore, require no further description.

By the practice of the present invention it is possible to use insulation thicknesses smaller than are usually used in solid type cables, and approaching or equalling those usually used in the so-called oil-filled type cables. Such decreased amount of insulation is successful only when the impregnation of the insulating wrappings is maintained 100% or nearly so during the service life thereof.

It will be seen by those familiar with the art that the construction herein described provides a cable whose characteristics are that of the so-called oil-filled type, while it is constructed in a manner of the solid type of cable. At the same time it becomes unnecessary for the cable of this invention to be connected to external oil reservoirs which are used for the purpose of allowing for the expansion and contraction of oil in the cable. It is obvious, therefore, that this construction will result in a cable fully as efficient and satisfactory as the more expensive oil-filled type of cable, but requires much less expense in its installation due to the elimination of the necessity for the reservoirs mentioned above. Coupled with these advantages the sheath structure of the present invention is flexible thereby permitting the same to be laid in arcuate or angular paths without detrimentally affecting the expansion and contraction of the materials contained within the sheath.

Having broadly and specifically described the present invention it is apparent that many modifications and departures may be made therein without departing essentially from the nature and scope thereof as may be included within the following claims.

What I claim is:

1. A sheath for a fluid impregnated cable comprising a strip of metal wound helically into a tubular structure, the adjacent edges of said strip being interlockingly engaged and soldered together in an oil impervious seal, and the center longitudinal section of said strip being convoluted to form a helical channel longitudinally of the sheath opening to the interior of said tubular structure, said channel overlying a substantial portion of the width of the strip and forming an expansible and contractible chamber for the cable fluid.

2. A sheath for a fluid impregnated cable comprising a strip of copper of relatively high elasticity wound helically into a tubular structure, the adjacent edges of said strip being interlockingly engaged and soldered together in an oil impervious seal, and the center longitudinal section of said strip being convoluted to form a helical channel longitudinally of the sheath opening to the interior of said tubular structure, said channel overlying a substantial portion of the width of the strip and forming an expansible and contractible chamber for the cable fluid.

3. A fluid impregnated cable comprising a conductor insulated with a wrapping of oil absorbing material, a shielding tape wrapping around the insulation and a sheath comprising helically wound strips of metal of relatively high elasticity, said strip having its adjacent edges interlocked and soldered to each other forming a continuous sheath and the center section of said strip being outwardly convoluted longitudinally of the strip to form an overlying channel opening interiorly to the said sheath.

4. A fluid impregnated cable comprising a plurality of electrical conductors, each of said conductors having a wrapping of oil absorbing insulating material around it, a shielding tape enclosing the said conductors and insulating material, and a metal sheath enclosing the said tape, insulating material and conductors, said sheath consisting of helically wound metal strip of relatively high elasticity, the adjacent edges of the strip being interlocked and soldered together to form a continuous and fluid impervious sheath and having the center section of said strip outwardly convoluted into an overlying channel extending longitudinally of the strip, the said channel opening interiorly into said sheath, and a filling of oil in said sheath.

5. In the cable structure described and claimed in claim 3, a hollow conductor.

FRANK L. AIME.